J. B. HAGGER.
REPAIR PIPE COUPLING.
APPLICATION FILED JULY 30, 1914.
1,145,582.
Patented July 6, 1915.
2 SHEETS—SHEET 1.
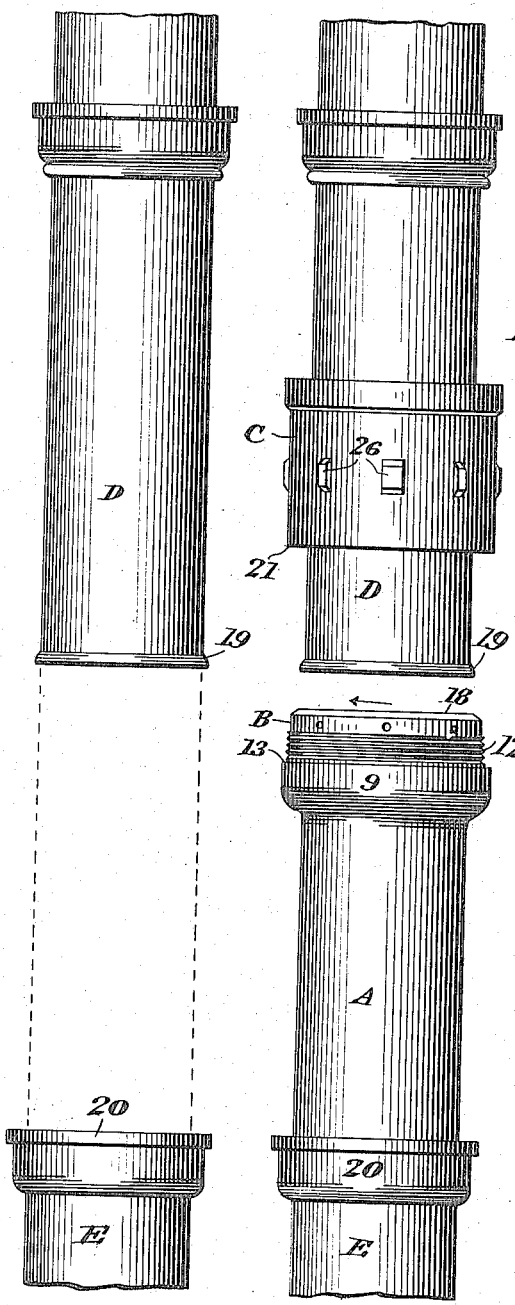
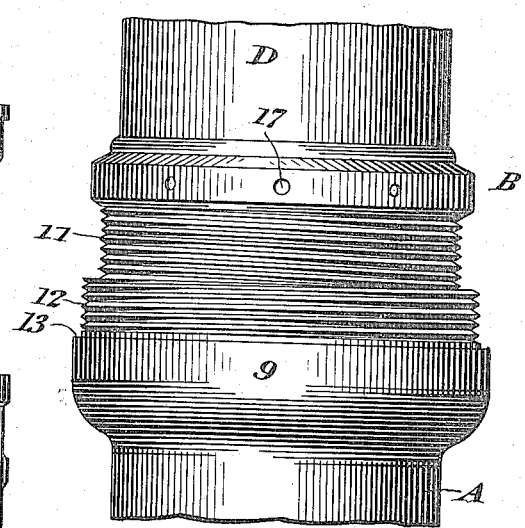
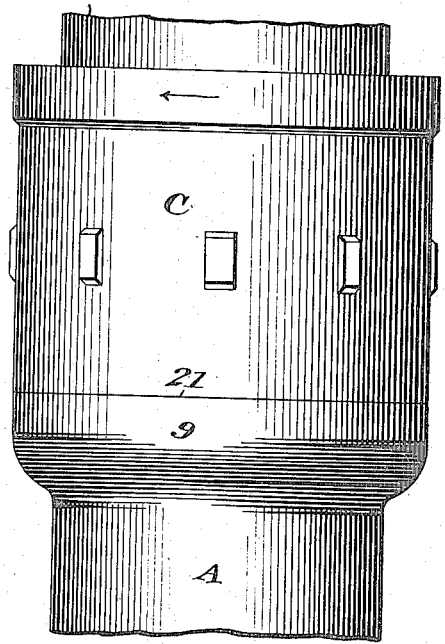
Inventor
Joseph B. Hagger

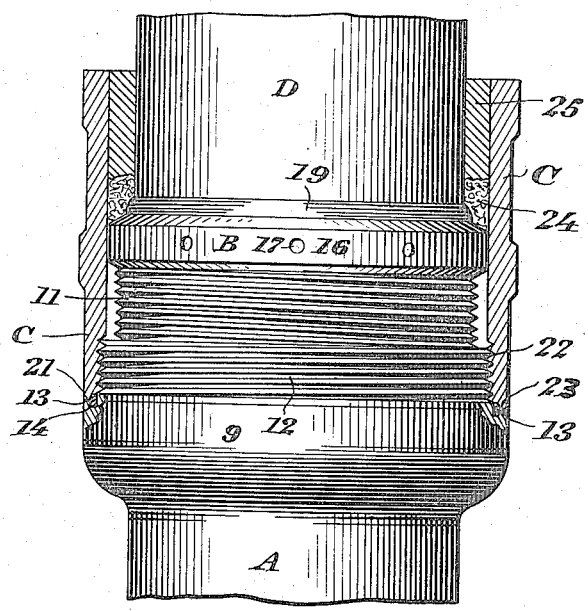
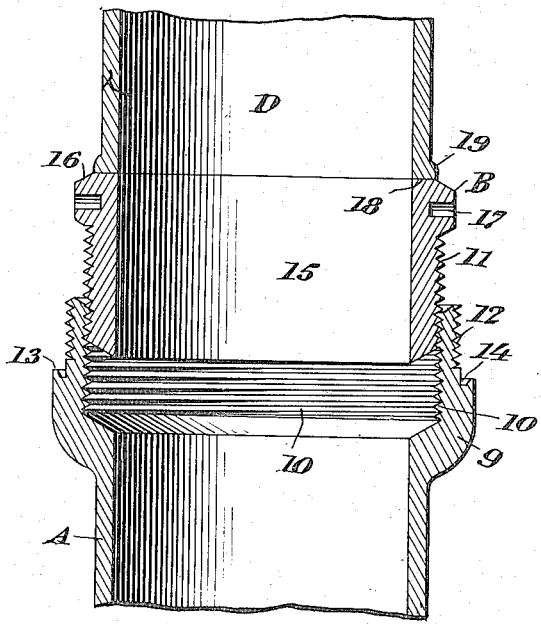
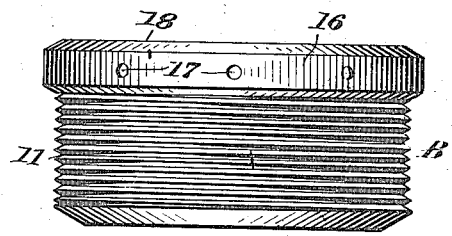

UNITED STATES PATENT OFFICE.

JOSEPH B. HAGGER, OF BALTIMORE, MARYLAND.

REPAIR PIPE-COUPLING.

1,145,582.  Specification of Letters Patent.  Patented July 6, 1915.

Application filed July 30, 1914. Serial No. 854,090.

*To all whom it may concern:*

Be it known that I, JOSEPH B. HAGGER, a citizen of the United States, residing at Baltimore, in the State of Maryland, have invented certain new and useful Improvements in Repair Pipe-Couplings, of which the following is a specification.

This invention relates to an improved repair pipe-coupling for facilitating the insertion in a line of pipe, of a new section of pipe, to replace a section which for some reason has been removed from the line.

The invention is illustrated in the accompanying drawing in which,—

Figure 1, is a view of a line of pipe showing an interruption or space in the line from which a section of pipe has been removed. Fig. 2, is a view of the line of pipe showing a new section of pipe made according to the present invention, and partly replaced in the space from which an original section had been removed. Fig. 3, is a side view on a larger scale showing some of the screw-parts of the adjustable repair joint which are shown in section in Fig. 5. Fig. 4, is a side view on the same scale as Fig. 3, showing the finished adjustable pipe joint. Fig. 5, is a side-view of the screw-parts, and a section view of the sleeve and packing of the finished joint shown in Fig. 4. Fig. 6, is a section view of same parts shown in Fig. 3. Fig. 7, is a side view of the screw-adjuster separate from the other parts.

This invention is particularly useful in pipe repair wherever it becomes necessary to remove a section of a pipe from the line of pipe, and fill the space thus produced in the line by placing therein another section.

The adjustable repair joint of the present invention has the advantageous feature that the new section of pipe, which is to fill the space that has been occupied by the removed section, will itself support that part of the broken line of pipe that constitutes the hanging or pendant end, while the work of repair is going on.

My improved device comprises a new section of pipe A, provided at its upper end with a screw-thread, a screw-adjuster B, mounted at the upper end of said new-section, and a sleeve joint-protector C, surrounding the screw-adjuster and other parts of the joint. The new section of pipe A, has at its upper end the usual funnel or bell-mouth 9; this mouth part has an internal screw-thread 10, and on its outer surface has an external screw-thread 12. Below the said external thread there is formed a surrounding seat 13, having a packing groove 14.

The screw-adjuster B, is a ring or short pipe whose internal surface 15, is smooth and free of threads and has the same diametrical measurement as the pipe sections A and D; on its exterior this adjuster has an external screw-thread 11, which, in the present instance, is a left-hand screw, and engages the internal thread 10, on the bell-mouth of section A. At its upper part the screw-adjuster is thicker and forms a ring or collar 16, provided with sockets or pits 17, with which the dog-prong of a wrench may engage for the purpose of turning the part B; and on top this screw-adjuster has a flat surface 18.

The sleeve C, has an inner bore or surface that is straight from top to bottom, and the internal diameter of this sleeve is slightly greater than the external diameter of the largest part of the screw-adjuster B; this relative size permits the said sleeve to take around the ring or collar 16, of said adjuster B, as seen in Fig. 5. Near its lower end 21, the internal surface of the sleeve C, has a screw-thread 22, which engages the exterior screw-thread 12, on the bell part 9, of the new section of pipe A; at the lower edge or extremity of this sleeve and below the thread 22, an internal annular groove 23, is formed. This groove on the sleeve is coincident in position with the packing groove 14, on the seat 13, of the new section of pipe A, and before the parts have been screwed together, any suitable packing material that may be inclosed in the grooves, 14, 23, will insure a tight joint.

Each section of pipe has at its spigot end the usual outer surrounding bead 19; and the other end of each section of pipe has the usual bell-mouth 20.

When placing this improved section of pipe A, in position in the broken line of pipe, the first step is to slip the sleeve C, upward on the spigot end of the pendant section of pipe D, where the break in the line commences, as seen in Fig. 2. The screw-adjuster B, at the bell-mouth 9, of the improved section A, should be screwed down close to said bell-mouth; then enter the spigot end of said improved section A, into the bell-mouth 20, of the section E, where the break in the line of pipe ends. Next turn the screw-adjuster B, to cause it to raise until its top surface 18, presses upward against the extreme lower edge of the spigot end 19, of pendant section D, as shown in Fig. 6. The next step is to place suitable packing material in the groove 14, of the improved section A, and then the sleeve C, that had been placed on the spigot end of pipe section D, should be slipped down in order that the internal screw-thread on the said adjuster B, may engage the exterior thread 12, on the section A, then the sleeve should be turned until its lower end 21, contacts with the seat 13, on the section A. The packing previously placed in the groove 14, will make this part of the joint tight. The thick top rim 16, of the adjuster will fit within the sleeve C, snugly but not tightly, and a suitable fibrous packing 24, such as oakum, should be tamped into the space within the sleeve, and above the said rim 16, and then lead 25, placed in the said space above the oakum packing. This will complete the joint. The cylindric sleeve C, is exteriorly provided with lugs, 26, for the engagement of a wrench used to turn the sleeve.

It is to be understood that this improvement is to be applied to all the familiar joints used in plumbing such as Y's and T's, particularly the sanitary T's.

Having thus described my invention what I claim is,—

1. A repair pipe-coupling consisting of a section of pipe having at one end a bell-mouth provided with an internal screw-thread, and on its exterior having a surrounding seat and provided above the seat with an external screw-thread; a ring-shaped screw-adjuster having on its exterior a screw-thread which engages the said internal screw-thread of the bell-mouth; and a sleeve that completely surrounds said ring-shaped screw-adjuster and provided near one end with an internal screw-thread that engages the exterior screw-thread of said bell-mouth.

2. A repair pipe-coupling consisting of a section of pipe having at one end a bell-mouth provided with a screw-thread; a ring-shaped screw-adjuster having a screw-thread which engages the screw-thread of said bell-mouth; and a sleeve joint-protector entirely surrounding said ring-shaped screw-adjuster and overlapping onto said bell-mouth.

3. A repair pipe-coupling consisting of a section of pipe having at one end a bell-mouth provided with a screw thread; a ring-shaped screw-adjuster having a screw-thread which engages the schrew-thread of said bell-mouth, and said screw-adjuster provided on its exterior with a thicker formation extending therearound like a collar and said collar formation having sockets or pits to receive the dog-prong of a wrench; and a sleeve joint-protector that surrounds said screw-adjuster and fits snugly about said collar formation above which a packing space is formed between the said screw-adjuster and sleeve.

4. A repair pipe-coupling consisting of a section of pipe having at one end a bell-mouth provided with an internal screw-thread, and on its exterior having a surrounding seat and an annular packing groove in the seat; a ring-shaped screw-adjuster provided on its exterior with a screw-thread which engages the said internal screw-thread of the bell-mouth; and a sleeve that surrounds said ring-shaped screw-adjuster and provided near one end with an internal screw-thread that engages the exterior screw-thread of said bell-mouth, and the lower extremity of said sleeve having an internal groove which is coincident in position with said annular packing groove on the seat of the bell-mouth.

In testimony whereof I affix my signature in presence of two witnesses.

JOSEPH B. HAGGER.

Witnesses:
 CHAS. B. MANN,
 MALCOLM F. GANNATT.